Patented Apr. 25, 1933

1,905,598

UNITED STATES PATENT OFFICE

CHAUNCEY C. LOOMIS, OF LENOX, MASSACHUSETTS, AND ALEXANDER DONALD MACDONALD, OF NEW YORK, N. Y., ASSIGNORS, BY MESNE ASSIGNMENTS, TO NEW ENGLAND LIME COMPANY, OF PITTSFIELD, MASSACHUSETTS, A CORPORATION OF DELAWARE

SIMULTANEOUS PRODUCTION OF CONDENSED CARBON DIOXIDE AND SLOW SETTING CEMENT

No Drawing.    Application filed June 5, 1929.  Serial No. 368,717.

This invention relates to the production of carbonic acid gas and calcium sulphate from limestone and sulphuric acid solution and has for one of its principal objects the economic production by this means of carbonic acid gas of sufficient purity for convenient use as a refrigerating agent and the simultaneous production of a slow setting calcium sulphate cement in contradistinction to ordinary calcium sulphate which does not possess cementing properties of this nature. The attainment of this objective by means of the present invention provides a new means for producing carbonic acid gas possessing the required degree of purity and other qualities which adapt it for use as a refrigerating agent without objectionable waste of raw materials and therefore at a cost under normal conditions which is comparable with or lower than the cost of production of this important refrigerating agent by the methods now in use.

The more common method of employing carbonic acid gas as a refrigerant is to first compress the gas under relatively high pressure and then permit it to expand under such conditions as to produce a cooling effect upon a portion of the gas which is thus congealed or solidified to produce carbonic acid gas or snow which is then formed in blocks and used as a transportable refrigerant. In this form it is usually referred to as dry ice.

Hitherto it has become a practice to prepare carbonic acid gas for refrigerating purposes from waste flue gases by bringing the gases into intimate contact with a solution of normal sodium carbonate ($Na_2CO_3$). The carbonic acid gas is selectively absorbed by the sodium carbonate solution forming a solution of sodium bicarbonate $NaHCO_3$ which is then subjected to evaporation and distillation at sufficiently high temperature to drive off the carbonic acid gas thus reconverting the bicarbonate into the normal carbonate which can be used again in the same manner, thus producing a cycle of operations. In actual operation of this process however many difficulties have been encountered which necessarily increase the cost of production of this material in a sufficient state of purity for satisfactory use as a refrigerating material. Many of these difficulties are connected with the fact that the original flue gases contain large percentages of atmospheric and other non-refrigerating gases which are difficult to remove completely in actual practice from the carbonic acid gas even by this method of selective absorption. Another difficulty arises from the necessity of handling such large volumes of the non-refrigerating gases, thus making it necessary to employ equipment of larger dimensions than would otherwise be necessary.

Because of the above mentioned difficulties as well as many others carbonic acid gas has not hitherto been produced on a cost basis which would bring it into general economic competition with other refrigerating agents adapted for use under like conditions such for example as ordinary ice notwithstanding the fact that the available supply of carbonic acid gas which goes to waste in the form of flue gases of various kinds is truly enormous.

By means of the present invention the above difficulties connected with the economic production of carbonic acid gas for refrigerating purposes are largely or completely overcome through the provision of means for the economic production of refrigerating carbonic acid gas directly from limestone with the simultaneous production of a useful form of calcium sulphate as a by-product possessing highly desirable properties as a slow setting cement. Thus by means of the present invention there is no waste of materials resulting from this direct production of carbondioxide refrigerant from limestone and consequently a new and enormously abundant supply of refrigerating gas is rendered available for this industry.

When ordinary limestone is treated with a relatively dilute solution of sulphuric acid by the usual method hitherto used for generating carbondioxide gas from limestone, in a Kipp apparatus, the resulting calcium sulphate formed in the reaction even after drying or calcining has a very few if any important commercial uses or applications in any of the industrial arts. Therefore this material or by-product represents just so much economic waste and this waste material of course includes the sulphuric acid originally employed for the decomposition of the limestone. The present invention overcomes this difficulty by providing a means whereby the calcium sulphate by-product is produced in a form or condition which renders it useful as a slow setting cement possessing properties very similar to those possessed by what is commonly known as Keen's cement. In this manner all of the raw materials employed in the new process are converted into useful and valuable products, thereby rendering the process as a whole available for the economic production of a carbondioxide refrigerant.

Various other objects and advantages of the present invention will become more evident from the following example which is given as one illustration of the manner in which our improved method and product may be brought into actual practise.

Example

Ordinary limestone is crushed or comminuted to a degree of fineness such that 90 percent of it or more will pass a screen having 10 meshes to the linear inch. This comminuted limestone is brought into intimate contact with 66° Baumé sulphuric acid solution in the following manner:

The comminuted limestone and sulphuric acid solution are separately fed from separate sources of supply into a mixer at a substantially constant rate in the proportion of about 116 pounds of the 66° Baumé sulphuric acid solution to each 150 pounds of limestone. The mixer employed may be any suitable type of enclosed continuous mixer of the paddle-conveyor type, such as the continuous mixer which is now commonly used for hydrating quick-lime by the so-called continuous process of hydration and commonly known as the Kritzer lime hydrator, except that it should be equipped with a system of collecting pipes for collecting the carbon dioxide gas as will be explained more fully further on.

The mixture of limestone and sulphuric acid solution is continuously stirred and simultaneously conveyed away from the zone where they are first brought into intimate contact along an enclosed passageway or path and this mixing and simultaneous movement of the mixed materials is continued until the sulphuric acid is substantially completely neutralized by chemical reaction with the comminuted limestone after which the solid reaction product or calcium sulphate is separated from the carbonic acid gas. This end point of the reaction may conveniently be determined by collecting a 1 gram portion of the mixture and shaking it up with about 10 cc of water in a test tube and testing for the presence of free or uncombined sulphuric acid by any suitable acid indicator such as methyl red solution.

The heat produced by the chemical reaction between the comminuted lime and the sulphuric acid solution is conserved and utilized in sufficient amount to drive off the excess moisture and to raise the temperature of the mixture to about 170° C. before separating the solid product from the gas. This is accomplished by regulating the loss of heat by radiation convection, etc. from the reaction mixture so that sufficient heat is retained in the reacting mass to evaporate the excess water and raise the reaction mass to the temperature specified, 170° C.

The solid product resulting from this procedure is in the form of lumps and is substantially free from moisture and consists mainly of a peculiar form of calcium sulphate which possesses slow setting cementing properties as indicated above. This neutral product is continuously removed from the mixer as rapidly as it is formed. It is then cooled and ground to any degree of fineness in which form it is conveniently adapted for the preparation of slow setting cement as above indicated.

During the chemical reaction between the sulphuric acid solution and the limestone, air or other foreign gas is excluded from the mixer and the air-free carbonic acid gas which is produced by the chemical reaction is collected in any convenient manner as for example by means of a system of collecting pipes connected with the mixer. The air free carbonic acid gas collected in this manner is then available for conversion into dry ice, or solidified carbonic acid gas, by the well known methods already referred to above or it may be compressed and cooled and stored in cylinders suitable for shipment and later converted into dry ice or used for any purpose for which substantially pure carbonic acid gas is known to be useful.

The solid reaction product consisting mainly of calcium sulphate of the type which possesses slow setting cementing properties, is useful for the preparation of wall plaster, plaster board, perforated building blocks and building materials generally where a slow setting cement is required or desirable. It is also useful for any other purposes for which slow setting calcium sulphate cement is known to be adapted.

It will be understood that our invention is not restricted to the specific procedure, conditions and proportions set forth in the preceding example but that certain variations may be made therein without departing from the true scope of the invention as set forth in the appended claims.

Thus for instance the concentration of the sulphuric acid solution employed may be varied between about 40% by weight of sulphuric acid to any desired higher degree of concentration of acid, although when concentrations greater than about 98% sulphuric acid are employed the speed of the reaction is increased to an objectionable degree so that it is difficult to limit the temperature of the reaction mixture to a sufficiently low value to prevent too rapid volatilization of sulphuric acid fumes. These fumes are objectionable to the workmen and also produce corrosion to the apparatus, etc. necessary for carrying out the process.

The temperature of the reacting mixture may be varied between the limits of about 110° C. and about 300° C. but if the temperature is substantially below the lower limit indicated the product either does not possess the slow setting properties desirable or else the speed of reaction is objectionably slow. When temperatures above the higher limit are employed the speed of the reaction is too great for proper control of the heat of the reaction and the fumes of sulphuric acid produced are objectionable.

As previously mentioned we have discovered that when a relatively dilute solution of sulphuric acid is employed in our process the calcium sulphate resulting from the chemical reaction for some unknown reason does not possess desirable slow setting cementing properties even after it is dry or calcined and for this reason we have discovered that it is essential to employ sulphuric acid solution having a concentration within the limits above specified. This limitation of the concentration of the sulphuric acid solution is one of the most important features of the present invention.

The limestone employed in accordance with the present invention may be comminuted to any convenient degree of fineness before mixing with the sulphuric acid solution but we have discovered that if any substantial proportion of the particles of the comminuted limestone are larger than about 1/6 inch in diameter, the speed of the chemical reaction is slowed down to an objectionable degree and the process becomes uneconomic in practice.

When the method of the present invention is carried out in accordance with the example given or in accordance with the indicated allowable variations therein, the calcium sulphate product produced will be found to contain varying amounts of total water capable of being driven off entirely at temperatures above about 170° C. but we have found that if this percentage of total water is more than about 36 parts by weight to each 136 parts by weight of anhydrous calcium sulphate, the resulting product does not possess the desirable slow setting properties mentioned and therefore in carrying out the procedure of the present invention the concentration of the sulphuric acid and the temperature of the reacting mixture should be adjusted to such values that the calcium sulphate produced contains less than the above specified proportion by weight of total water.

By means of our invention a portion of the energy of the chemical reaction may be utilized for compressing the carbonic acid gas prior to its conversion into dry ice by known methods. This result may be accomplished by permitting the pressure of the carbonic acid gas to build itself up inside the apparatus to any desired value which the apparatus can conveniently be constructed to withstand. If the pressure thus generated is not sufficient for economic conversion of the compressed gas into solid carbon dioxide, auxiliary mechanical compression may be applied to the gas until the desired pressure is attained.

In carrying out our improved process at increased pressure in the manner just described, the sulphuric acid may be forced from a supply feed reservoir into the reaction chamber by means of carbonic acid gas under pressure and the limestone fed from a closed supply bin filled with carbonic acid gas under a higher pressure than the gas inside the reaction chamber, the bin being provided with a feed opening and a cover therefor adapted to hold the increased pressure after the bin is filled with the limestone, and being provided also with means for shutting off communication between the bin and the reaction chamber so that after the bin has been emptied of limestone it can be disconnected from the reaction chamber and refilled.

It will of course be obvious that in converting the carbonic acid gas into the solidified form by the known procedure just described, its temperature is reduced either by artificial cooling or by expansion or both to the temperature usually employed for converting the carbon dioxide into the solid state under suitable pressure.

We claim:

1. The method of producing carbonic acid gas and slow setting calcium sulphate cement from limestone and sulphuric acid solution which comprises finely crushing limestone, bringing the finely crushed limestone and the sulphuric acid solution into intimate contact with each other, the limestone being employed in at least sufficient amount to neutralize the sulphuric acid, maintaining this intimate contact with exclusion of air until the chemical reaction between the limestone and sulphuric acid is substantially complete and the sulphuric acid completely neutralized and separating the carbonic acid gas from the slow setting calcium sulphate cement, the initial concentration of the sulphuric acid solution being limited to a concentration not less than about 40 parts by weight of sulphuric acid to each 60 parts by weight of water and the temperature of the reacting mixture of limestone and sulphuric acid being maintained between about 110 deg. C. and about 300° C.

2. The method of producing carbonic acid gas and slow setting calcium sulphate cement from limestone and sulphuric acid solution which comprises finely crushing limestone, bringing the finely crushed limestone and the sulphuric acid solution into intimate contact with each other by continuously feeding the finely crushed limestone and the sulphuric acid solution from separate sources of supply at a substantially constant rate into a reacting chamber in the proportion of not less than about one chemically equivalent weight of limestone to each chemically equivalent weight of pure sulphuric acid contained in the sulphuric acid solution, continuously removing the mixture of sulphuric acid and limestone away from the zone or region where they are first brought into intimate contact with each other, maintaining this intimate contact with exclusion of air until the chemical reaction between the limestone and sulphuric acid is substantially complete and the sulphuric acid completely neutralized and separating the carbonic acid gas from the slow setting calcium sulphate cement, the initial concentration of the sulphuric acid solution being limited to a concentration not less than about 40 parts by weight of sulphuric acid to each 60 parts by weight of water and the temperature of the reacting mixture of limestone and sulphuric acid being maintained between about 110 deg. C. and 300 deg. C.

CHAUNCEY C. LOOMIS.
ALEXANDER DONALD MACDONALD.